US005509201A

United States Patent [19]

Ingwersen

[11] Patent Number: 5,509,201

[45] Date of Patent: Apr. 23, 1996

[54] WIRE POSITION SHIFTING MECHANISM AND METHOD OF ASSEMBLING WIRE HARNESSES

[75] Inventor: Peter Ingwersen, Gilberts, Ill.

[73] Assignee: Molex Incorporated, Lisle, Ill.

[21] Appl. No.: 323,987

[22] Filed: Oct. 17, 1994

[51] Int. Cl.[6] ..................... H01R 43/04; B23P 19/00

[52] U.S. Cl. ..................... 29/861; 29/759; 29/33 F

[58] Field of Search ..................... 29/749, 759, 33 F, 29/861

[56] References Cited

U.S. PATENT DOCUMENTS

| | | | |
|---|---|---|---|
| 3,936,933 | 2/1976 | Folk et al. . | |
| 4,043,017 | 8/1977 | Folk et al. | 29/749 |
| 4,245,387 | 1/1981 | Reidt | 29/749 |
| 4,333,230 | 6/1982 | Funcik et al. | 29/749 |
| 4,367,575 | 1/1983 | Forster et al. | 29/749 X |
| 4,370,806 | 2/1983 | Funcik et al. | 29/749 |
| 4,409,734 | 10/1983 | Baraglia et al. | 29/759 X |
| 4,441,251 | 4/1984 | Grubb | 29/749 X |
| 4,492,023 | 1/1985 | Schneider et al. | 29/749 X |
| 4,493,147 | 1/1985 | Bakermans | 29/861 |
| 4,572,248 | 2/1986 | Pegram et al. | 140/92.1 |
| 4,614,028 | 9/1986 | Rich | 29/749 |
| 4,766,668 | 8/1988 | Urness et al. . | |
| 5,010,642 | 4/1991 | Takahashi | 29/749 X |

FOREIGN PATENT DOCUMENTS

| | | |
|---|---|---|
| 2244579 | 9/1990 | Japan . |

*Primary Examiner*—Carl J. Arbes
*Attorney, Agent, or Firm*—Charles S. Cohen

[57] ABSTRACT

A wire-shifting apparatus particularly suited for use in assembling wire or cable harnesses includes a pedestal portion having a plurality of individual, elongated wire guide members thereon. The wire guide members have a channel-like cross-section and some of the wire guide members are fixed in the position upon the pedestal portion, while others of the wire guide members are mounted on the pedestal portion so as to pivot about a fixed point so that upon urging by an actuator, the movable wire guides shift laterally in unison. The shifted wire guides then convey wires between two opposing connector elements in a manner such that selected wires are terminated at locations in one connector element which are removed one location from the other connector element.

22 Claims, 4 Drawing Sheets

WIRE POSITION SHIFTING MECHANISM AND METHOD OF ASSEMBLING WIRE HARNESSES

BACKGROUND OF THE INVENTION

The present invention relates generally to the assembly of electrical connecting devices, such as wire or cable harnesses and, more particularly, to an apparatus for shifting selective wires in positions between opposing connectors within the harnesses during fabrication thereof.

Wire harnesses are typically fabricated by terminating one or more wires at opposing ends of the wires to opposing first and second connector elements. Typically, in wire harnesses, the wires extend generally parallel to each other in a manner such that the first wire extends between the first termination position of the first connector and the first termination position of the second connector element, the second wire extends between the second termination position of the first connector element and the second termination position of the second connector element, and so forth with all of the wires of the harness being terminated between corresponding termination portions of the first and second connector elements.

It is sometimes desirable to have some of the wires in the harness shifted in their corresponding termination positions between their opposed first and second connector elements. In such applications, the first wire of the harness may extend between the first termination position of the first connector element and the first termination position of the second connector element, while the second wire may extend between the second termination position of the first connector element and the third termination position of the second connector element, and further, the third wire may extend between the third termination position of the first connector element and the fourth termination position of the second connector element and so on. In this type of wire harness, selected wires of the wire harness are shifted laterally between their opposing first and second connector elements to termination positions in one connector element which are one removed from their original termination position in the first connector element.

Some prior art devices are known for the assembly of wire harnesses in which one or more wires are displaced with their connections or in their extent between the first and second connector elements. These devices are for the most part complex in their design. Some wire harness assembly devices, such as that described in U.S. Pat. No. 4,493,147, issued Jan. 15, 1985, rely upon a reciprocating blade member which moves vertically to block off a wire pathway leading to a termination position of the second connector element. This device is complex and is not conducive to simultaneously shifting multiple wires within the wire harness.

The present invention is directed to an apparatus which offers a simplified apparatus and method for simultaneously shifting one or more selected wires of a plurality of wires in a wire harness assembly laterally to displace the selected wires one position removed as between opposing connector elements which terminate the ends of the wire harness.

Accordingly, it is an object of the present invention to provide an improved wire-shifting apparatus having a plurality of wire guides removably disposed thereon which receive a plurality of wires corresponding in number to the number of wire guides during the assembling of a wire harness, some of the wire guides being restrained from movement within the apparatus and other wire guides being movable within the apparatus, whereby wires entering the movable guides may be selectively shifted laterally with respect to each other.

It is another object of the present invention to provide a method of manufacturing a wire harness by feeding a plurality of wires into a plurality of wire guides which are disposed in the path of the wires and leading to a wire harness connector element, providing a wire-shifting apparatus which shifts selected ones of the wire guides, aligning the wire guides at the entrance of the wire-shifting apparatus into a first predetermined pattern, shifting selected ones of the wire guides into a second predetermined pattern by displacing the selected wire guides laterally such that, when terminated, selected wires of the wire harness extending from the first connector element engage the opposing second connector element at different lateral locations.

It is another object of the present invention to provide an apparatus for shifting selected wires of a plurality of wires during the assembly of such wires into wire harnesses, wherein the harnesses include a plurality of wires extending together in side-by side order between two opposing connector elements and selected wires of the harness are shifted laterally with respect to the remaining wires in the harness, whereby the selected wires extend from certain termination positions in one connector element to other termination positions in the other connector element which are laterally offset from the first connector element termination positions, wherein the apparatus includes a wire guide platform having a plurality of wire guides mounted thereon, each wire guide including an elongated channel having a base portion which engages the platform, some of the wire guides being fixed in position upon the platform, and other wire guides being movable upon the platform, the movable wire guides having a pivot member defining a point upon the platform about which each movable wire guide pivots, the movable wire guides further engaging a rack which reciprocates within the apparatus, movement of the rack within the apparatus laterally shifting the movable wire guides.

It is still yet a further object of the present invention to provide an apparatus for assembling wires in a wire harness, wherein the apparatus includes a frame which holds a plurality of wires therein without tangling, the frame having a plurality of elongated wire guide members disposed thereon which are laterally shiftable upon the frame around a predetermined point, whereby shifting of the wire guides shifts the wires into selected positions within a connector element, the wires being subsequently shifted back into their starting positions and applied to a connector element.

It is yet a further object of the present invention to provide an apparatus for laterally shifting selected wires during a wire feeding process in which the wires are shifted between circuit locations of two opposing connector elements terminated to opposing ends of the wires, the apparatus including a planar support surface with a plurality of wire guide elements disposed thereon in a preselected pattern, some of the wire guide elements being pivotally mounted on the support surface and others being fixedly mounted thereon, both of the fixedly and pivotally mounted wire guide elements being removably mounted on the support surface, whereby the wire guide elements may be easily rearranged to fit any number of chosen wire shifting patterns.

SUMMARY OF THE INVENTION

The present invention accomplishes these benefits by providing a pedestal portion supported by a frame which supports a plurality of elongated wire guides, the wire guides having parallel sidewalls which define corresponding elongated channels which extend the length of the wire guides. The wire guides may be either fixed or movable upon the pedestal portion. The fixed wire guides define straight wire paths between opposing entrance and exit portions of the frame, while the movable wire guides define angled wire paths between same.

In another principal aspect of the present invention, the pedestal portion includes a substantially planar support surface which supports the fixed and movable wire guides, the fixed wire guides engaging the support surface at two locations and the movable wire guides pivotally engaging the support surface at one location. The support surface further has a transverse slot which slidably receives a rack therein. The rack has a plurality of engagement channels disposed thereon which engage portions of the movable guide members to urge them around their pivot points.

In yet another principal aspect of the present invention, the rack is actuated by a pneumatic cylinder in its reciprocating movement within the support surface slot, the movement occurring upon demand during feeding of a plurality of wires into the respective fixed and movable wire guides. Both the fixed and movable wire guides may be easily interchanged in their engagement within the support surface to permit easy changing of the wire guide patterns.

These and other objects, features and advantages of the present invention will be clearly understood through a consideration of the following detailed description.

BRIEF DESCRIPTION OF THE DRAWINGS

In the course of this description, reference will be frequently made to the attached drawings in which.

DESCRIPTION OF THE PREFERRED EMBODIMENTS

Figure 1A:
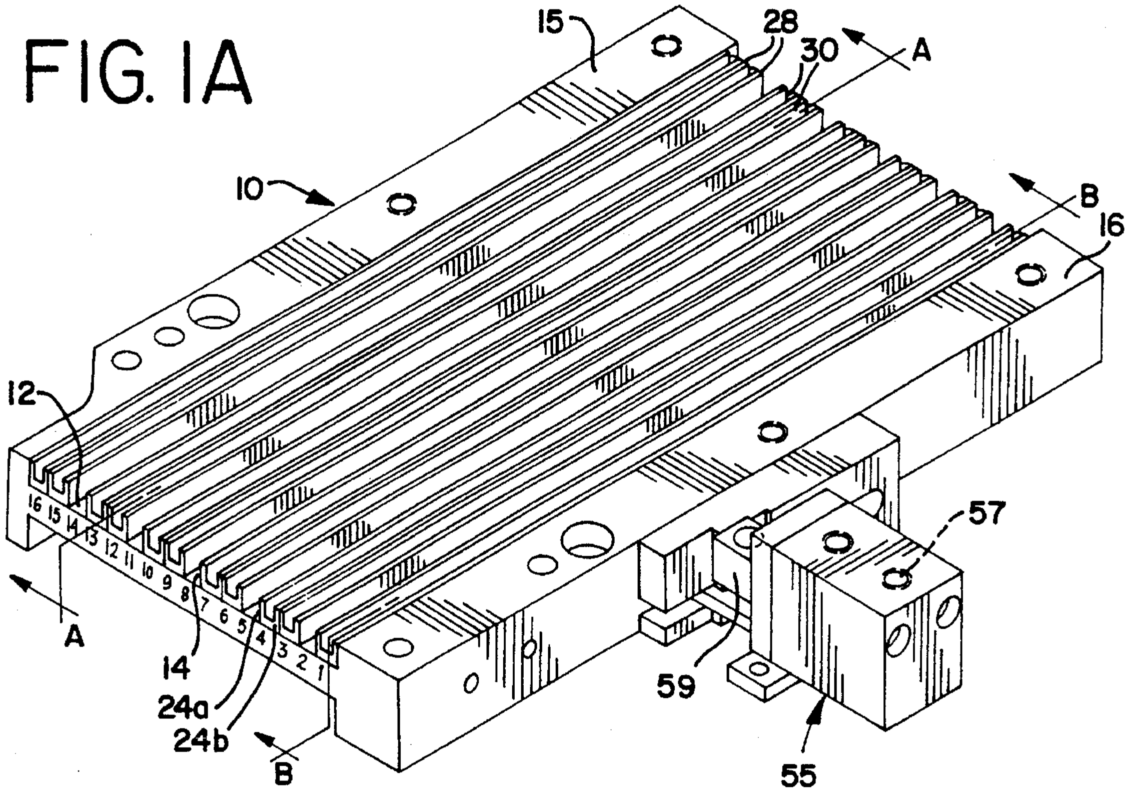
FIG. 1A is a perspective view of a wire-shifting apparatus constructed in accordance with the principals of the present invention.
Figure 2:
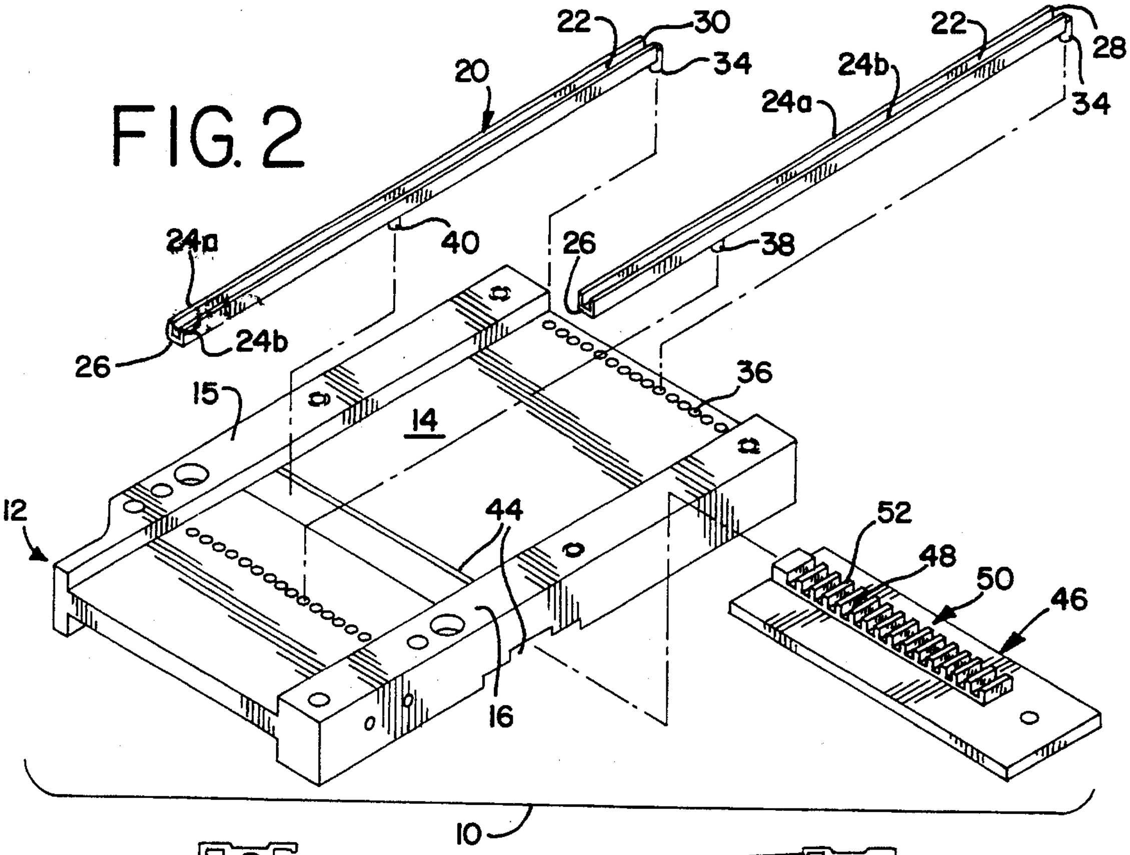
FIG. 2 is an exploded view of the apparatus of FIG. 1A with some of the components removed for clarity.

FIGS. 1A and 2 illustrate a wire shifting apparatus, generally indicated at 10, constructed in accordance with the principles of the present invention. It can be seen that the apparatus 10 includes a frame, or pedestal portion 12, having a generally planar wire guide support surface 14 defined thereon disposed between two generally parallel sidewalls 15, 16. The frame 12 supports a plurality of wire guides 18, 20 thereon. As best illustrated in FIG. 2, each wire guide 18, 20 includes an elongated channel 22 which receives a wire longitudinally therein during operation of the apparatus. The channel 22 is defined by two sidewalls 24*a*, 24*b* and a base portion 26. The sidewalls 24*a*, 24*b* may have their opening edges 28 rounded (FIG. 2) to present smooth surfaces at the inlet 30 of the apparatus (and the wire guides 18, 20) in order to prevent any wires entering the guides from catching on the edges 28. The wire guide base portions 26 rest on the frame guide support surface 14. The fixed wire guides 18 remain in position upon the support surface 14 while the movable wire guides 20 move laterally thereon during a shifting operation.

The wire guides 18, 20 each engage the apparatus frame 12 along a common line proximate to the entrance of the apparatus 10. Each wire guide 18, 20 is preferably provided with a first engagement means such as a cylindrical post 34 extending downward at the inlet end 30 thereof. Each such post 34 is received in a corresponding opening 36 formed in the wire guide support surface 14 of the frame 12. As will become evident in the description to follow, the first engagement posts 34 and their corresponding openings 36 define axes about which the movable wire guides 20 may pivot to laterally shift the wire guides 20 one wire position to the left or right on the apparatus support surface 14.

Each of the wire guides 18, 20 preferably further include another frame engagement means, illustrated as second posts 38, 40. The second posts 38 are associated with the fixed wire guides 18 while the second posts 40 are associated with the movable wire guides. 20. These second engagement posts 38, 40 are longitudinally spaced from the wire guide first posts 34 and extend down from the wire guide base portions 26 in the same manner as first engagement posts 34. The posts 34, 38 and 40 may be integrally formed in the wire guide members 18, 20 as illustrated, or they may be separately formed and fixed to the wire guide members through appropriately positioned openings in the base portions thereof (not shown). The second posts 38 of the fixed wire guide members 18 are received in corresponding openings 42 defined in the wire guide support surface 14, whereby the fixed wire guide members 18 remain firmly in position in their preselected locations on the apparatus frame 12. The first and second engagement posts 34 and 38 of the fixed wire guide members 18 thus engage support surface 14 to prevent any movement of the fixed wire guide members upon the support surface 14.

In contrast to the fixed wire guide members 18, the second engagement posts 40 of the movable guide members 20 are not received within fixed openings in the wire guide support surface 14, but are received within a transverse slot, or cavity 44, which extends between the apparatus sidewalls 15, 16. This slot 44 houses a means for engaging the movable wire guide members 20 and affecting the lateral movement thereof during operation of the apparatus 10. Importantly, the slot 44 receives an actuator, illustrated as an elongated rack 46, which extends therein between the opposing sidewalls 15, 16 of the frame 12. The actuating rack 46 has a plurality of engagement openings illustrated as grooves 48, which are spaced-apart from each other along a frame engagement portion 50 thereof and which are separated by intervening lands 52. The lands 52 not only define the width of the grooves 48, but also define vertical engagement surfaces 54 formed by the sidewalls of the lands 52 which may abut the movable wire guide member second posts 40.

Figure 1B:
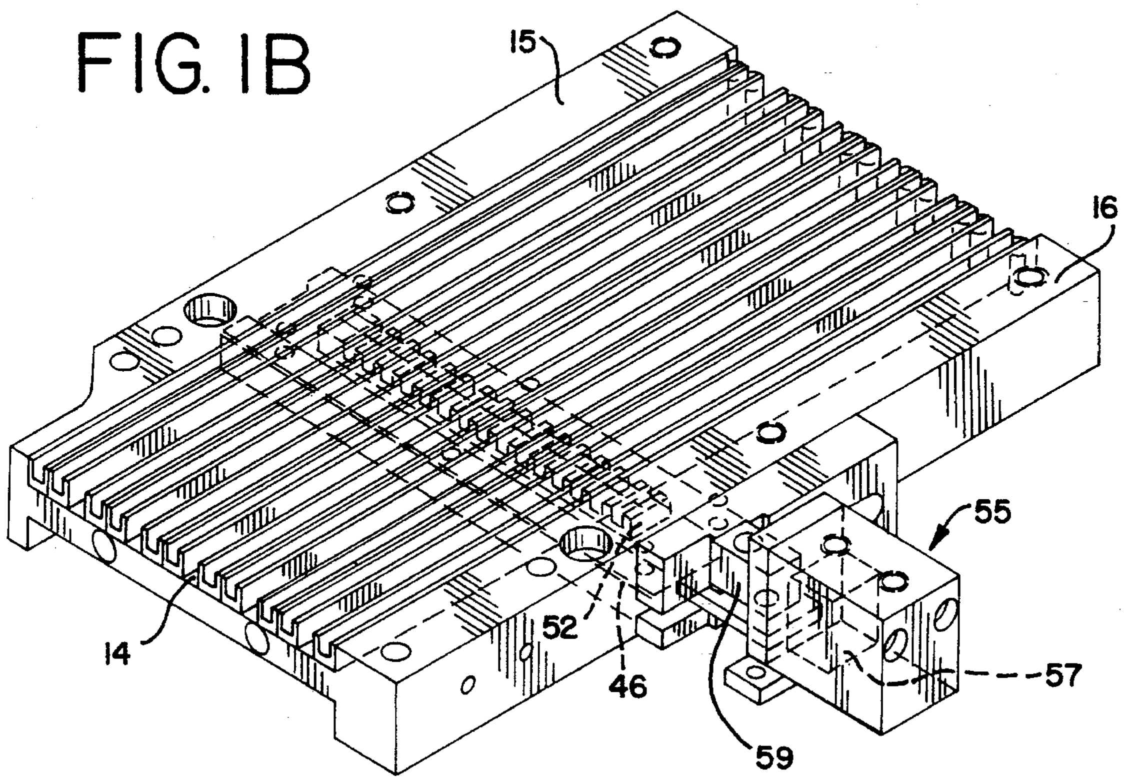
FIG. 1B is the same view as FIG. 1A, but illustrating, in phantom, the interengagement of the shifting components of the wire shifting apparatus.

In order to actuate the shifting apparatus and operate the rack 46 in a reciprocating lateral movement within the frame slot 44, the apparatus preferably includes an actuating assembly 55 which actuates the shifting apparatus in response to a suitable actuation signal issued from a control means (not shown). This actuating assembly 55 is best illustrated in FIGS. 1A & 1B and may include a pneumatic cylinder 57 having a interior plenum operatively connected to a piston rod or engagement head 59. The engagement head 59 in turn is operatively connected to the rack 46 near the end thereof and provides a surface against which air entering the pneumatic cylinder 57 may urge the engagement head 59 out of the cylinder 57 to actuate the movable wire guide members 20 in a shifting movement upon the apparatus support surface 14. An adjustable stop 60 having two steps 62, 64 is positioned to limit the stroke of cylinder 57 and rack 46. By shifting stop 60, the movable wire guide members 20 may be shifted either one or two positions. Although the present invention is described herein as being actuated by a pneumatic assembly 55, it will be understood that other suitable means may also be used to accomplish the shifting movement of the movable wire guides upon demand such as a solenoid assembly, hydraulic cylinder, stepper motor or the like and, as such, the present invention is not be construed as limited to operation by the pneumatic means described herein.

Figure 3:
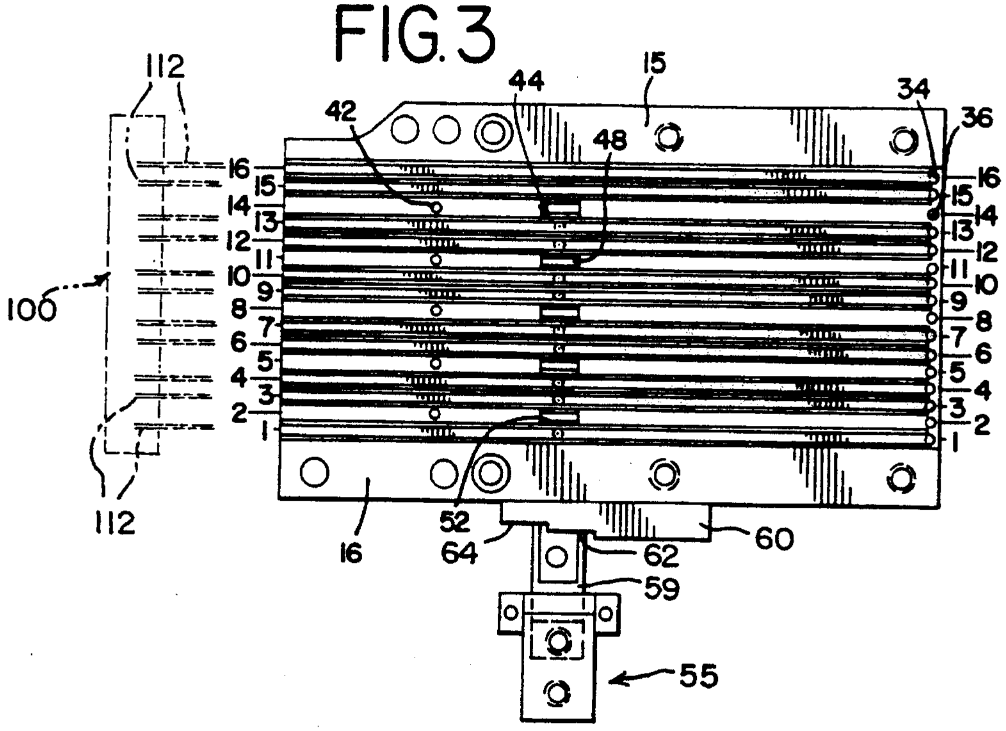
FIG. 3 is a plan view of the apparatus of FIG. 1A illustrating the apparatus in an unshifted position.
Figure 4:
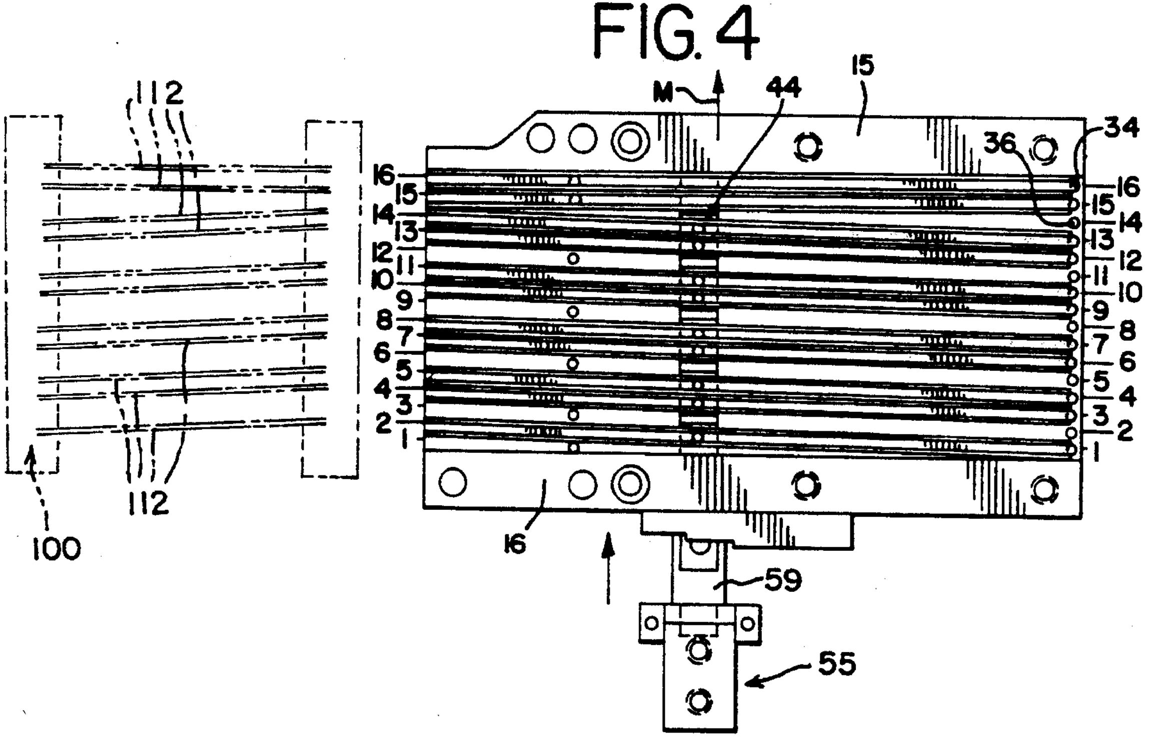
FIG. 4 is the same view as FIG. 3, but illustrating the apparatus in a shifted position.
Figure 5A:
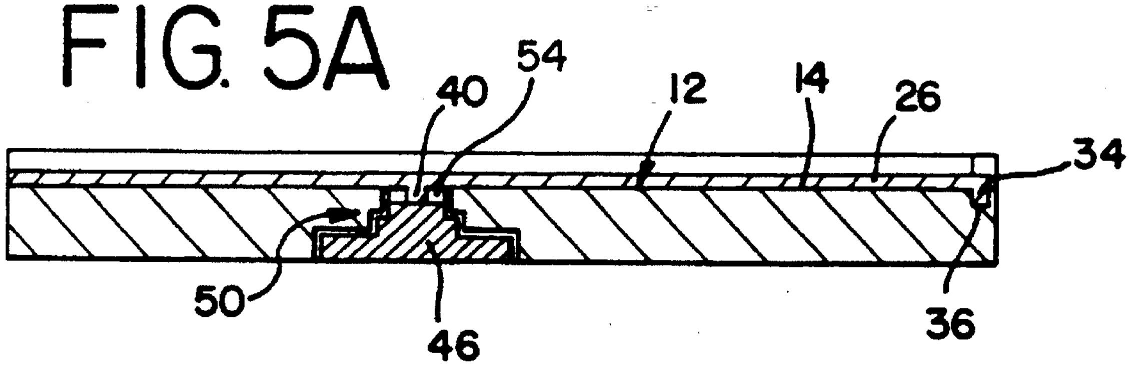
FIG. 5A is a sectional view taken along lines A—A of FIG. 1A illustrating a shiftable wire guide member in place upon the apparatus.
Figure 5B:
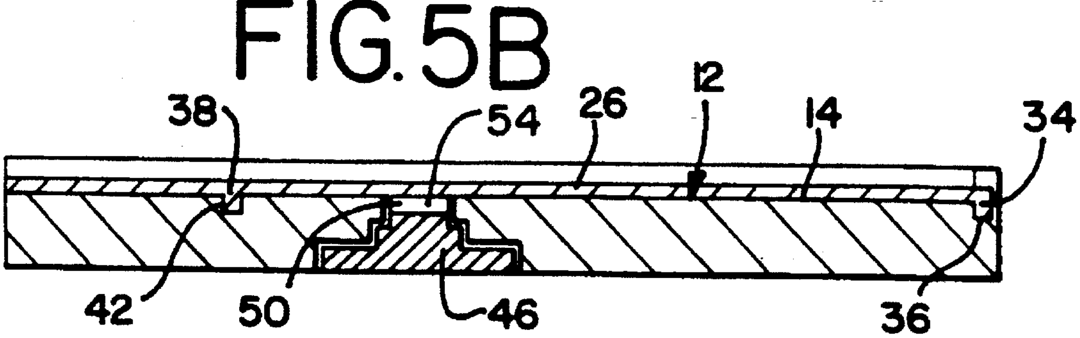
FIG. 5B is a sectional view taken along lines B—B of FIG. 1A, illustrating a fixed wire guide member in place upon the apparatus.

The operation of the apparatus 10 may be understood by reference to FIGS. 3 & 4, which together illustrate one of the many shifting configurations of which the apparatus 10 is capable. Wires are fed from right to left into the entrance 30 of the apparatus 10 from individual wire supply reels and advanced within selected wire guides 18, 20 of the apparatus 10 which are identified by the corresponding position numbers 1–16 indicated along the entrance and exit portions. The wires are fed to an appropriate termination station and terminated to a first connector element 100, shown in phantom. The first connector element 100 is moved away (to the left in FIGS. 3,4) from the termination station and the feeding of the wires is resumed. During this feeding process, a second connector element 102 (shown in phantom) is moved to the termination station and the actuating assembly moves the rack 46 laterally within the slot 44 of the frame 12 to shift some of the wires. This movement is illustrated in FIG. 4 and occurs in the direction indicated by arrow M. The movement of the rack 46 imparts a like movement to the movable wire guide members 20 by way of their second posts 40 which engage the rack grooves 48. The movable wire guides 20 mounted on the support surface 14 thereby pivot around their first engagement posts 34 and consequently are aligned with a different connector element termination position.

In FIGS. 3 & 4, a series of wire guides are illustrated in place on the apparatus 10 corresponding to first connector element termination position numbers 1,3,4,6,7,9,10,12,13, 15 and 16 indicated at the right and left of FIG. 3. A representative first connector element 100 is shown in phantom downstream of apparatus 10 with wires 112 (also in phantom) at these positions. As discussed below, after termination of the wires to the first connector element, the first connector element is moved downstream (to the left in FIGS. 3 and 4) and the wire fed in the same direction. As the wires 112 are fed, the actuating assembly 55 shifts the rack 46 laterally within the frame slot 44 so that the movable wire guide members 20 are shifted laterally to occupy second connector element termination position numbers 1,3,4,6,7, 6,10,12 and 13 (at left of FIG. 4). Only the movable wire guides 20 are shifted, while the fixed wire guides 18 which occupy position numbers 15 and 16 remain in their original positions. The wires are then terminated to a second connector element 102. Such completed wire harness is shown in phantom in FIG. 4.

Table 1 below sets forth in tabular form, the shifting movement illustrated by the particular arrangement of the apparatus in FIGS. 3 and 4.

TABLE 1

| UNSHIFTED | | SHIFTED | |
|---|---|---|---|
| WIRE GUIDE ENTRANCE POSITION NUMBER | WIRE GUIDE EXIT POSITION NUMBER | WIRE GUIDE ENTRANCE POSITION NUMBER | WIRE GUIDE EXIT POSITION NUMBER |
| 1 | 1 | 1 | 2 |
| 3 | 3 | 3 | 4 |
| 4 | 4 | 4 | 5 |
| 6 | 6 | 6 | 7 |
| 7 | 7 | 7 | 8 |
| 9 | 9 | 9 | 10 |
| 10 | 10 | 10 | 11 |
| 12 | 12 | 12 | 13 |
| 13 | 13 | 13 | 14 |
| 15 | 15 | 15 | 15 |
| 16 | 16 | 16 | 16 |

Figure 6:
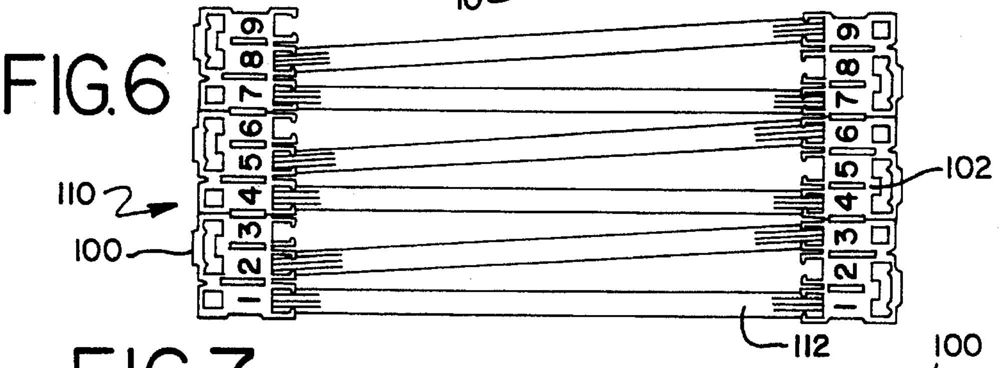
FIG. 6 is a plan view of the wire harness having six circuits and produced using the apparatus of FIG. 1A; and, FIG. 7 is a somewhat schematic plan view of a wire harness assembly machine in which the apparatus of FIG. 1A may be used.

FIG. 6 is a plan view of a wire harness 110 assembled using the apparatus 10 of the present invention. It can be seen that the harness 110 includes a number of wires 112 extending in general side-by-side order between opposing connector elements 100 and 102. The first connector element 100 has a series of wire termination positions designated by numbers 1–9 which are positioned generally opposite a like number of corresponding wire termination positions formed in the second connector element 102, also designated by numbers 1–9. Some of the wires, such as those occupying position numbers 1, 4 and 7, extend generally parallel to each other between the opposing connector elements 100, 102 in a straight path. These wires have passed through fixed wire guides 18 of the apparatus and occupy a "straight" position within the wire harness. Other wires in the harness, such as those which begin at position numbers 2,5 and 8 in first connector element 100 have been shifted in their terminations positions in the second connector element 102, and extend at an angle away from the "straight" wires. These angled wires are ones which have been shifted laterally during feeding through movable wire guides 20 of the apparatus.

The pedestal portion 12 of the apparatus preferably has both sets of engagement post-receiving openings 36,42 formed therein in alignment with positions which may be occupied by either the fixed or movable wire guides 18, 20 which permits any desired pattern of shifting to be easily accommodated in the apparatus. Accordingly, it will be appreciated that any number of such wire guides 18, 20 may be inserted upon the pedestal 14 in any preselected pattern which accommodates the final wire harness design. It thus may be seen that the present invention affords a simple and reliable means to produce wire harnesses in which selected ones of the wires of the harnesses are shifted as between their opposing connector element termination positions.

It should be noted that although the electrical connector elements depicted herein are shown as one relatively long member, the principles of the present invention could be used with smaller connector elements that are processed and terminated simultaneously. In other words, rather than a single connector element having sixteen termination positions, two connector elements having eight termination positions (or four connector elements having four termination positions, etc.) could be utilized.

The apparatus 10 is particularly suitable for use in cable or wire harness-making where it is desired to feed individual wires or cables longitudinally in closely spaced relation from wire supplies to a termination station where opposing ends of the cables or wires are terminated to connector elements. A suitable wire-making machine is described in U.S. Pat. No. 4,766,668, issued Aug. 30, 1988 and assigned to the assignee of the present invention.

Figure 7:
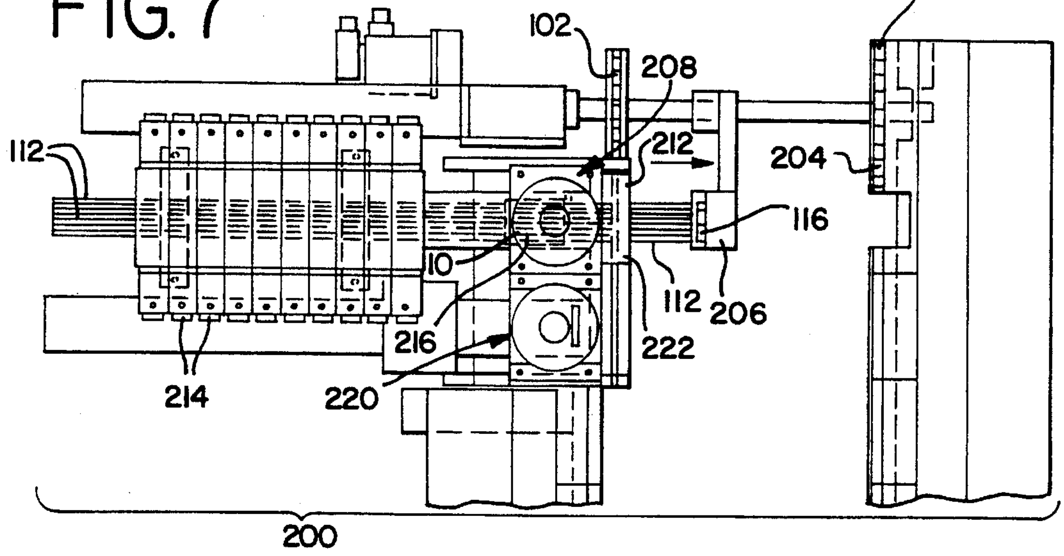

FIG. 7 illustrates a wire-harness making machine 200 in which the apparatus 10 of the present invention may be utilized and in which a wire harness, such as that illustrated at 110 in FIG. 6 may be made. In the machine 200, a plurality of first connector elements 116 are fed along a feed slot 204 until the are received within a reciprocatable carriage assembly 206. Once in place within the carriage assembly, the connector elements 116 are shuttled to a termination assembly 208. A plurality of individual wires 112 are fed from individual wire supplies (not shown) into a termination head portion 212 of the termination assembly 208 where they are received within corresponding wire-receiving openings therein. As the wires 112 are fed from their respective supplies by individual feed motors 214, they pass through a wire-shifting apparatus 10 of the type hereinabove described which is in its unshifted position as shown in FIG. 3.

After the wires 112 are fed into the first connector element 100, they are attached thereto. The first connector element is moved away from the termination station along the longitudinal axes of the wires and the wires are fed through the wire shifting apparatus 10. After or while a predetermined amount of wire is fed, the wire shifting apparatus is actuated to properly position the wires for subsequent termination to a second connector element. After shifting the desired wires, the wires are clamped in place and cut. A second connector element 102 has been fed to the termination head 212 whereupon the previously cut wires are terminated to the second connector element, to thereby form a completed wire harness having a plurality of individual wires extending between two opposing connector elements. Once completed, the wire harnesses are moved laterally through the machine 200 for subsequent processing.

Thus, the present invention allows for increased flexibility in the manufacturing of wires harnesses in that, among others, it provides the benefit of shifting the termination location between connector elements without the use of complex crossovers. It further permits the design of the wire harnesses to be changed during production runs without significant downtime in that the fixed and movable wire guides may be quickly and easily replaced.

It will be appreciated that the embodiments of the present invention discussed herein are merely illustrative of a few applications of the principles of the invention. Numerous modifications may be made by those skilled in the art without departing from the true spirit and scope of the invention.

We claim:

1. A wire guiding apparatus for use with a mechanism for assembling wire harnesses in which each of the wire harnesses includes a plurality of individual wires extending between opposing first and second connector elements terminated to the wires at opposite ends of said wires, said wire receiving openings of one of said termination blocks being aligned with corresponding ones of the wire receiving openings of the other of said termination blocks, the wire guiding apparatus being adapted to shift selected ones of said wires from preselected termination positions on said first connector element to non-corresponding termination positions on said second connector element, the wire guiding apparatus comprising:

a support platform;

a plurality of wire guide members disposed on said support platform, each of said wire guide members having an elongated wire guiding portion with entrance and exit portions disposed at opposite ends for receiving the wires longitudinally therethrough between said entrance and exit portions thereof, said wire guide members including distinct fixed and movable guide members;

said fixed guide members fixedly engaging said support platform and being oriented upon said support platform such that their associated wire guiding portions assume a generally parallel relationship to each other;

said movable guide members pivotally engaging said base in a manner which permits said movable guide members to be shifted between a first orientation wherein said movable guide members are generally parallel to said fixed guide members and a second orientation wherein said movable guide members are generally non-parallel to said fixed guide members; and, movable guide member shifting means for shifting said movable guide members between said first and second orientations, whereby wires entering said movable guide members are shifted between termination positions of the first connector element and non-corresponding termination positions of said second connector element.

2. The wire guiding apparatus as defined in claim 1, wherein each of said fixed guide members includes two engagement members spaced apart along a longitudinal axis of said fixed guide member, said engagement members being received by corresponding openings in said support platform.

3. The wire guiding apparatus as defined in claim 1, wherein each of said movable guide members includes two engagement members spaced apart along a longitudinal axis of said movable guide member, a first one of said two engagement members being pivotally received in an opening in said base and a second one of said two engagement members engaging said shifting means.

4. The wire guiding apparatus of claim 1, wherein said support platform includes a pair of upstanding sidewalls and said movable guide member shifting means includes an actuator extending between said support platform sidewalls and movable along a reciprocating path which intersects said wire guiding portions of said wire guide members, said actuator including means for engaging a portion of said movable guide members to shift said movable guide members between said first and second orientations.

5. The wire guiding apparatus of claim 4, wherein said actuator includes an elongated rack, the rack having a plurality of movable guide member engagement surfaces thereon.

6. The wire guiding apparatus of claim 5, wherein each of said movable guide members have an engagement post which projects therefrom into contact with one of said rack engagement surfaces.

7. The wire guiding apparatus of claim 1, wherein said support platform includes a transverse slot, said movable guide member shifting means extends through said slot and engages a plurality of engagement portions disposed on said movable guide members.

8. The wire guiding apparatus of claim 1, wherein said base includes a slot extending between said support platform sidewalls, said movable wire guide member shifting means including an elongated rack slidably disposed in said slot, the rack including a series of spaced-apart grooves separated by intervening lands, each of the grooves defining an engagement cavity corresponding in number to said movable guide members, said engagement cavities receiving corresponding engagement posts of said movable wire guide members.

9. The wire guiding apparatus of claim 8, further including a pneumatic assembly for shifting said movable wire guide members between said first and second orientations.

10. The wire guiding apparatus of claim 1, wherein said movable guide member shifting means includes a slidable carriage which selectively moves within a slot of said support platform, said support platform slot opening towards said movable guide members and said carriage includes a plurality of openings which engage lugs of said movable guide members.

11. The wire guiding apparatus of claim 1 wherein at least some of said elongated wire guiding portions are channel-shaped.

12. The wire guiding apparatus of claim 1 wherein said wire guide members are removably mounted on said support platform.

13. A wire shifting mechanism for use in conjunction with the assembly of wire harnesses in which each wire harness includes the plurality of wires extending between opposing termination blocks, each of the two opposing termination blocks containing a plurality of wire-receiving openings adapted to accommodate opposing ends of wires therein, said wire receiving openings of one of said termination blocks being aligned with corresponding ones of the wire receiving openings of the other of said termination blocks, said mechanism being adapted to shift selected wires between selected wire-openings of said one termination block and non-corresponding wire openings of said other termination block, said mechanism comprising:

a base having a shifting bed, the shifting bed supporting a plurality of first and second wire guiding means thereon in a preselected orientation, each said first wire guiding means including an elongated guide track fixedly disposed on said shifting bed such that said first wire guiding means are restrained from any shifting movement on said shifting bed, said first wire guiding means being maintained in a generally parallel relationship whereby a wire passing through any one of said first wire guiding means and terminated to said opposing termination blocks is positioned within corresponding wire-receiving openings of said opposing termination blocks, each said second wire guiding means including an elongated guide track pivotally disposed on said shifting bed such that said second wire guiding means are movable between first and second operative positions, said second wire guiding means being generally parallel to said first wire guiding means in said first operative position and said second wire guiding means being angled to said first guiding means, said mechanism further including shifting means for shifting said second wire guiding means between said first operative position and said second operative position whereby a wire entering any of said second wire guiding means is shifted between a wire receiving opening of said one termination block and a non-corresponding wire receiving opening of said other termination block.

14. The apparatus as defined in claim 13, wherein said movable guide tracks are skewed with respect to said fixed guide tracks when said movable guide tracks are in said second operative position.

15. The apparatus as defined in claim 13, wherein each of said first and second elongated guide tracks includes an elongated channel extending between opposing ends of said first and second wire guiding means, one of the opposing ends defining an inlet end and the other said of opposing ends defining an outlet end, said first and second wire guiding means further including a first lug disposed thereon and proximate to said inlet ends thereof, the first lugs engaging said base, said first and second wire guiding means further including second lugs thereon spaced from said first lugs, said second lugs of said first wire guiding means fixedly engaging said base and said second lugs of said second wire guiding means engaging said shifting means.

16. The apparatus as defined in claim 15, wherein said shifting means includes a carriage member slidably disposed in said base and extending between said sidewalls.

17. The apparatus as defined in claim 13, wherein said shifting means includes a rack slidably mounted within an elongated cavity defined within said base and extending generally transversely to the longitudinal axes of said wire guiding means, the rack being reciprocably movable between said base side walls, the carriage having slot means for engaging said second guide members.

18. The apparatus as defined in claim 13, wherein said second wire guiding means pivot around their inlet ends in response to movement of said shifting means.

19. The apparatus as defined in claim 13, wherein said base member includes opposed spaced apart sidewalls and an open slot extending between said side walls and said shifting means includes a carriage member slidable within said slot, the carriage member having engagement means disposed thereon which engage a portion of said second wire guiding means.

20. The apparatus as defined in claim 13, wherein said guide member selective movement said guide member selective movement means includes an elongated rack extending within an elongated cavity defined in said base, the rack having a plurality of grooves defined therein, the grooves receiving a like plurality of engagement posts extending from said movable guide members into said base cavity.

21. A method for assembling a wire harness, comprising the steps of:

providing a wire shifting mechanism with an entrance and exit having a plurality of first and second wire guide members thereon, said first wire guide members being fixedly mounted to said shifting mechanism to define fixed wire passages extending between said shifting mechanism entrance and exit, said second wire guide members being movably mounted to said shifting mechanism to define movable wire passages extending between said shifting mechanism entrance and exit and movable between first and second operative positions;

providing a first electrical connector having a connector body with a plurality of wire-receiving openings therein and aligning said wire-receiving openings with said first and second wire guide members such that each of said first and second wire guide members are in said first operative position and are further in alignment with a wire-receiving opening of said first connector;

feeding a plurality of wires into said shifting mechanism such that an individual wire enters each of said first and second wire guide members;

terminating said wire in said first connector wire receiving opening;

shifting said second wire guide members to said second operative position to shift the alignment of said second wire guide members with respect to said first connector;

advancing said plurality of wires such said wires enter said first connector wire-receiving openings;

shifting said second wire guide members back into said first operative position;

advancing said plurality of wires into said second connector wire-receiving openings; and terminating said wires in said second connector wire receiving openings.

22. An apparatus for changing the order of wire in an array of wires, comprising:

a support surface, first and second wire guide means disposed on the support surface, the first wire guide means having means for engaging said support surface which retains said first wire guide means in place upon said support surface and which restrains said first wire guide means from movement, means for urging the second wire guide means between first and second operative positions on said support surface, said second wire guide means having means for engaging said support surface and defining a point upon said support surface about which said second wire guide means pivots in response to said urging means, said urging means effecting a lateral displacement in the order of wires in said array as between opposing ends of said wires.

* * * * *